United States Patent Office 3,824,085
Patented July 16, 1974

3,824,085
ESTERS OF POLYMERIC HYDROXYPROPYL CARBOHYDRATES AND METHOD OF USING SAME AS GELLING AGENT FOR ORGANIC SOLVENTS
James Teng, St. Louis County, Marcella C. Stubits, St. Louis, and Richard E. Pyler and James M. Lucas, St. Louis County, Mo., assignors to Anheuser-Busch, Incorporated, St. Louis, Mo.
No Drawing. Filed Feb. 1, 1972, Ser. No. 222,660
Int. Cl. C10l 7/02
U.S. Cl. 44—7 B    14 Claims

ABSTRACT OF THE DISCLOSURE

This disclosure involves esters of hydroxypropyl cellulose and hydroxypropyl starch, specifically the acetate and laurate. These cellulose esters are useful as gelling agents for organic solvents. The hydroxypropyl cellulose acetate is prepared at low cost under mild conditions and is particularly useful in gelling methylene chloride (useful in paint stripping) and methyl and ethylene bromide (useful as soil fumigants). The hydroxypropyl cellulose laurate is particularly useful as a gelling agent for jet fuel.

REFERENCE OF OTHER APPLICATIONS

This application contains subject matter in common with co-pending application Ser. No. 154,219 now Pat. No. 3,730,693 which is a continuation-in-part of application Ser. No. 845,067 filed July 25, 1969 (now abandoned).

BACKGROUND OF THE INVENTION

In a wide variety of applications there exists the need for a product which will thicken or gel organic solvent based formulations. To meet this need, several gelling agents for organic solvents are available on the market. These generally belong to one of two categories: colloidal particles (such as silica) and metallic soaps (aluminum soap).

In prior work of the present inventors, cellulose and starch laurates have been used as gelling agents for jet fuel, fumigants, and other hydrocarbons and non-polar solvents. We also have used these derivatives as fat and oil absorbing agents. This work is described in pending patent applications filed in the names of one or more of the inventors of this application.

These inventions work well for their specified purposes. However, the cost of cellulose laurate is high and the amount used is such that under present economics of manfacture, the cost precludes widespread use of our prior products and processes.

For special applications, where no other gelling agent proves effective, the relatively high cost of these polysaccharide derivatives may not preclude their use. However, in large scale use, it will be a prime consideration.

We also have used cellulose acetate in a special application for absorbing oil spills on water. Because of its economy and special reuse properties, cellulose acetate is very useful in this particular application. An application for patent is pending on this development.

We now have found that laurates of high molecular weight hydroxypropyl cellulose are particularly useful in gelling or thickening jet fuel at concentrations of about 1% by weight with little insoluble residue present and little viscosity variation in the gelled fuel caused by temperature changes. The lack of residue is important in jet fuel because of the nozzles, etc. through which the fuel passes prior to combustion in the very complex jet engine. Viscosity variation is undesirable because of the temperature extremes an airplane may encounter.

We have developed another effective, low cost, and generally applicable gelling agent; namely, the acetate esters of hydroxypropyl cellulose. These are effective gelling agents for a series of commercially important solvents (Table I), in particular, for methylene chloride, which is the primary solvent used in paint stripping formulations; and for methyl bromide and ethylene bromide, which are among the most widely used soil fumigants.

The preparation of these derivatives is economical, based on both material and processing costs. The reactions are run under mild conditions with no special equipment required. The reactants include only acetic anhydride, pyridine, and the hydroxypropyl cellulose. Any of a number of inert solvents may be used, e.g. kerosine, toluene, dioxane, or methylene chloride.

The products of this invention are soluble polymers capable of thickening or gelling a wide variety of solvents. These gelling agents provide many desirable properties which are lacking in the presently available gelling agents. They are easy to handle, creating no dust or bulk problem and no special equipment, such as homogenizers, are needed for dissolution. The gel which is formed has a long shelf life, developing no syneresis, and is stable to temperature changes and vibrational influences. The gel has smooth elastic body but not to the point of excessive stringiness. Gels can usually be formed at concentrations below 2% of gelling agent. The present gelling agents are soluble in a wide range of organic solvents and are effective thickeners or gellants at low concentrations. The thickened solutions exhibit thixotropic or pseudo-plastic properties at low concentrations. This facilitates handling of the thickened solutions in pumping and mixing.

Products of this invention can be made in the form of chips, powder or concentrated solutions, and are inert, non-ionic, non-hygroscopic, and non-toxic. Solutions and gels may be easily prepared by adding the hydroxypropyl cellulose derivatives to a solvent under high speed agitation. Heat may be used to speed dissolution. Solution may also be effected through the use of recirculating gear pumps. For certain applications, preparation of a concentrated gel followed by dilution to the appropriate level may be advantageous.

DETAILED DESCRIPTION

The hydroxypropyl cellulose to be used as the base for an effective compound can have a degree of molar substitution (M.S.) of about 2 to about 8. This type of product is described in U.S. Pat. Nos. 3,278,520–21. A commercially available hydroxypropyl cellulose is sold under the name "Klucel." It is a product of Hercules, Inc., Wilmington, Del., and has an M.S. of about 4.1.

The M.S. determines the number of moles of

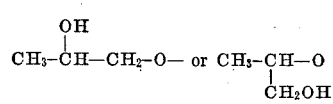

groups per anhydroglucose unit.

The esters of hydroxypropyl cellulose can have a degree of substitution (D.S.) of 0 to 3. The theoretical maximum is a D.S. of 3. With the acetate, the degree of substitution for effective compounds is about 1.2 to about 2.8; with the laurate, the degree of substitution is about 2 to about 3.

The amount of polymeric carbohydrate derivative is at least about 0.2 grams per 100 ml. of solvent and may be as much as about 20 grams per 100 ml. When hydroxypropyl cellulose acetate is used, the amount is generally 1 to 2 grams/100 ml. solvent to be gelled.

The final gel has a specific gravity substantially that of the solvent being gelled, generally between about 0.7 to about 2.

After mixing, the hydroxypropyl cellulose ester solvent mixture is allowed to stand for about 5 to about 60 minutes to complete gelation or thickening.

The reaction product when recovered as a dry product has a particle size of 40 to 80 mesh (U.S. Standard Sieves). This is not critical and can be varied.

The hydroxyethyl celluloses or starches are useful as gelling agents when converted into esters, such as laurate or acetate. The M.S. of hydroxyethyl cellulose or starch is 1 to 4. The D.S. of the ester is 1.2 to 3.

All of these materials can be gelled effectively at temperatures below the boiling point and above the freezing point of the fluid to be gelled.

A method of measuring the gelling ability of the gelling agents of this invention is set forth in *Polymer Handbook* edited by E. H. Immergut, Interscience Publishers (1966). This method utilizes a solubility parameter or "δ" which is a thermodynamic property of solvents and may be used to measure their mutual compatibility. For example, two solvents with the same δ value will be miscible and a solute with the same δ value will be soluble in both, regardless of the nature of the solvents. Once the δ value for a given polymer is determined by dissolution in a few solvents, all other solvents with comparable δ values will also dissolve it.

Hydroxypropyl cellulose acetate gels solvents within the solubility parameter of 8–12; whereas hydroxypropyl cellulose laurate gels solvents within the solubility parameter of 6–10.

The term solubility as used in this context has a somewhat different meaning than it conventionally has. Solubility is used generally to indicate the extent of interaction between a solid and a solvent. A piece of solid, when placed in a solvent, will dissolve into the solvent until the saturation point is reached. At that point, the two phases, solid and liquid coexist at equilibrium. The amount of solute in liquid is measured as the solubility of the material in solution. However, there is no such saturation point in the case of the gelling agents of this invention. When immersed in a "compatible" solvent, the gelling agents swell and dissolved. As more and more gelling agent is added, the material will continue to swell and dissolve. When there is insufficient solvent to dissociate completely the polymers, then swelling only occurs. A single phase (solution or gel) is reached at all times. To examine qualitatively the compatibility of a gelling agent, 5 g. of gelling agent is placed in 100 ml. of solvent. It is compatible if only one phase is observed (gel or solution). It is incompatible when the mixture retains two phases.

Following are examples of solvents with their corresponding solubility parameter. The hydroxypropyl cellulose acetate gels solvents with a solubility parameter of 8–12 and hydroxypropyl cellulose laurate gels those with a solubility parameter of 6–10.

TABLE I

Poorly Hydrogen Bonded Solvents

| Solvent | Solubility Parameter |
|---|---|
| 1. Hexane | 7.3±0.1 |
| 2. Turpentine | 8.1 |
| 3. Carbon Tetachloride | 8.4 |
| 4. Toluene | 8.9 |
| 5. Benzene | 9.2 |
| 6. Styrene | 9.3 |
| 7. Bromobenzene | 9.4 |
| 8. Chlorobenzene | 9.5 |
| 9. Ethylene Bromide | 9.7 |
| 10. Acrylonitrile | 10.5 |
| 11. Acetonitrile | 11.5 |

Medium Hydrogen Bonded Solvents

| Solvent | Solubility Parameter |
|---|---|
| 12. Isoamylacetate | 7.8±0.1 |
| 13. Ethyl Methacrylate | 8.3 |
| 14. Ethyl Acetate | 8.4 |
| 15. Ethyl Acrylate | 8.6 |
| 16. Butyl Acrylate | 8.8 |
| 17. Butyraldehyde | 9.0 |
| 18. n-Dibutylphalate | 9.3 |
| 19. Ethyl Bromide | 9.6 |
| 20. Acetone | 9.9 |
| 21. 1,4-Dioxane | 10.0 |
| 22. Dimethylphate | 10.7 |
| 23. N,N-Diethyl formamide | 12.1 |

Strongly Hydrogen Bonded Solvents

| Solvent | Solubility Parameter |
|---|---|
| 24. Dodecanol | 8.1 |
| 25. Lauryl Alcohol | 8.1 |
| 26. Piperidine | 8.2 |
| 27. Cyclohexamine | 9.1 |
| 28. Propionic Acid | 9.9 |
| 29. Acetic Acid | 10.1 |
| 30. Glacial Acetic Acid | 10.1 |
| 31. Pyridine | 10.3 |
| 32. Quinoline | 10.8 |
| 33. Cyclohexanol | 11.4 |
| 34. Allyl Alcohol | 11.8 |
| 35. Acrylic Acid | 12.0 |
| 36. Propylene Glycol | 12.6 |

One advantage of this process in some situations is that the hydroxypropyl cellulose and acetic anhydride are dissolved in the material to be gelled and the gel forms in situ.

SPECIFIC EXAMPLES

Following are specific examples of methods of making the esters of this invention and of using these to gel organic solvents.

Example No. I 5 grams (g.) of Klucel (hydroxypropyl cellulose) of M.S. 4.1 is dissolved in 100 ml. of toluene. Thirty ml. pyridine and 12 ml. acetic anhydride are added with stirring at 25° C. The clear solution increases greatly in viscosity and after 1 hour 150 ml. of acetone is added to reduce the viscosity and the resulting solution is poured slowly into 2.5 liters of water. After decantation of the solvent, the residue is resuspended in water and methanol (5:1 v./v.) with stirring. After decantation and air drying, the product is recovered as a gummy residue in an amount of 6.4 grams. This product is a soft gum having a melting point of about 190° C., a specific gravity of 1.017 g./cc. and D.S. of approximately 3.

Example No. II 5 grams of hydroxypropyl cellulose of M.S. 4.1 is suspended in 100 ml. dioxane. Pyridine (3.1 ml., corresponding to 1 equivalent per hydroxyl group) and acetic anhydride (3.6 ml., corresponding to 1 equivalent per hydroxyl group) are added with stirring at 25° C. The solution shows a large increase in viscosity after 15 minutes. After 1 hour at 25° C., acetone (100 ml.) is added. The solution is poured into water and the gummy residue is isolated by decantation, dissolution of the residue with chloroform, extraction of the chloroform solution with water, and removal of the chloroform under vacuum. 6.1 grams of product is recovered. The product is a gum having a D.S. of about 3, a melting point of about 190° C., and a specific gravity of 1.017 g./cc.

Example No. III

Hydroxypropyl cellulose (5 g.) is suspended in 200 ml. methylene chloride. Pyridine (3.1 ml.) and acetic anhydried (3.6 ml.) are added with stirring at 25° C. After 1 hour, an additional 200 ml. methylene chloride is added to give a thick gel, suitable for use as a paint stripper. The final product has a hydroxypropyl cellulose acetate concentration of about 1% by weight based on the weight of the final product.

Example No. IV

Hydroxypropyl cellulose (5 g.) is suspended in a mixture consisting of methylene chloride: toluene: paraffin oil (306:8.5:6.5 w./w.) which is suitable for stripping paint. Pyridine (3.1 ml.) and acetic anhydride (3.6 ml.) are added and the gradually thickening solution is stirred at 25° C. for 1 hour. The concentration of hydroxypropyl cellulose acetate in this formulation is 1.5% by weight. Portions of this gel were diluted with 1 volume and 2 volumes of the above solvent to give concentrations of 0.75% and 0.5%, respectively. These latter gels were still sufficiently viscous for use as paint strippers.

Examples III and IV show esterification reactions carried out in the solvent to be gelled. The hydroxypropyl cellulose is dissolved in the solvent to be gelled and pyridine and acetic anhydride are added to this composition. This process eliminates the separation of the hydroxypropyl cellulose acetate from its reaction mixture as the final gum is formed in situ.

Example No. V

To a slurry of 39.5 g. of hydroxypropyl cellulose (M.S. 4.1) in 500 ml. of kerosine is added 24 ml. of pyridine and gradually over 5 minutes, 32 ml. of acetic anhydride. The solution is continuously stirred for 2 hours at room temperature and left without agitation for 18 hours. The solvent is decanted and 500 ml. of acetone is added; the resulting solution gels. The product is isolated by adding 250 ml. of 50% (v./v.) methanol and water followed by addition of three 50 ml. of 50% portions of water while the solution is vigorously agitated. A white gum-like precipitate is filtered, washed once with 50 ml. and water and air dried at 80° to a constant weight. A yield of 47.2 grams of hydroxypropyl cellulose acetate of 2.2 D.S. and average molecular weight of 1,000,000 is recovered.

Example No. VI

Ten grams of hydroxypropyl cellulose (M.S.=4) is dissolved in 300 ml. dioxane. 64 ml. pyridine is added and the mixture is heated to 100° C. 96 ml. of lauroyl chloride is added and the mixture is held at 100° C. for 2 hours, with constant stirring. After cooling, the ester is precipitated with methanol, dissolved in chloroform, reprecipitated, and dried for 2 hours at 80° C. A yield of 22 grams of hydroxy propyl laurate is obtained. Its D.S. is 2.8 and its average molecular weight is 1,500,000.

Example No. VII 1.0 gm. of the ester from Example No. VI is dispersed in 100 ml. Jet A (jet fuel) to produce a thin, smooth elastic gel of Brookfield viscosity at 10 r.p.m.:

| ° C. | Cp. |
|---|---|
| 38 | 60 |
| 23 | 120 |
| 4 | 250 |

Example No. VIII 5 g. of hydroxypropyl starch (M.S. 0.66) is suspended in a mixture of 200 ml. toluene and 32 ml. pyridine. 64 ml. lauroyl cholride is added to this mixture and the mixture is heated to 100° C. The mixture is held at this temperature for 2 hours with constant agitation. The starch laurate ester is precipitated, washed with methanol, and then dried at 80° C. The hydroxypropyl starch laurate reaction product has a laurate D.S. of 2.2.

Example No. IX

Hydroxypropyl starch (7.9 g.) is dispersed in hexane (75 ml.). Pyridine (4.8 ml.) and acetic anhydride (6.4 ml.) are added to the mixture. The resulting suspension is stirred at 25° C. for 2 hours. When the reaction is worked up as is done with the corresponding cellulose derivative, i.e. addition of water, filtration, and washing with water, the starch derivative does not precipitate. Instead, a cloudy solution is obtained. Removal of the solvents from this solution under reduced pressure yields the reaction product as a finely divided white powder. The powder is hydroxypropyl starch acetate of D.S. of 1.7.

Example No. X

Hydroxypropyl cellulose acetate (5 g. D.S. 2.2) is suspended in a mixture of 200 ml. of dioxane and 10 ml. of pyridine. 20 ml. of lauroyl chloride is added, the mixture is heated to 100° C., and the mixture is held at this temperature for 3 hours. The ester reaction product is precipitated with methanol, washed, and dried at 70° C. The yield of hydroxypropyl cellulose acetate-laurate mixed ester is 5.3 g. of a white gum.

What we claim is:

1. A gelled or thickened organic solvent having a solubility parameter of from about 6 to about 12 comprising an effective amount of a polymeric carbohydrate derivative selected from the group consisting of hydroxypropyl cellulose esters and hydroxypropyl starch esters and mixtures thereof, said esters having a degree of substitution of about 1.2 to about 3 and a degree of molar substitution of hydroxypropyl groups of about 2 to about 8.

2. The product of claim 1 wherein the polymeric carbohydrate derivative is hydroxypropyl cellulose laurate, and the solvent has a solubility parameter of about 6 to about 10.

3. The product of claim 2 wherein the organic solvent is jet fuel.

4. The product of claim 1 containing about 0.2 to about 20 grams gelant/100 ml. solvent.

5. The product of claim 4 wherein the polymeric carbohydrate derivative is hydroxypropyl cellulose acetate and the solvent has a solubility parameter of about 8 to about 12.

6. The product of claim 4 wherein the polymeric carbohydrate derivative is hydroxypropyl starch acetate.

7. The product of claim 4 wherein the polymeric carbohydrate derivative is hydroxypropyl starch laurate.

8. A process of gelling an organic solvent fluid having a solubility parameter between about 6 and about 12, comprising adding to said fluid a polymeric carbohydrate derivative selected from the group consisting of hydroxypropyl cellulose esters and hydroxypropyl starch esters and mixtures thereof in an amount sufficient to thicken or gel said fluid.

9. The method of claim 8 wherein the acid moiety is selected from acetate and laurate.

10. The method of claim 8 wherein the polymeric carbohydrate is a hydroxypropyl cellulose ester.

11. The method of claim 10 wherein the acid moiety is selected from acetate and laurate.

12. The method of claim 8 wherein from about 0.2 to about 20 grams polymeric carbohydrate/100 ml. fluid is added to the fluid to be gelled.

13. A method of gelling a solvent having a solubility parameter of about 6 to about 12 comprising mixing a polymeric carbohydrate selected from the group hydroxypropyl cellulose and hydroxypropyl starch in the solvent to be gelled, adding acetic anhydride and a catalyst thereto, adding acetone thereto and recovering a gelled solvent.

14. The method of claim 13 wherein the solvent contains methylene chloride and the polymeric carbohydrate is hydroxypropyl cellulose.

References Cited

UNITED STATES PATENTS

| 3,183,068 | 5/1965 | Monick | 44—7 B |
| 3,072,467 | 1/1963 | Wiczer | 44—7 B |

BENJAMIN R. PADGETT, Primary Examiner

U.S. Cl. X.R.

44—7 C